March 10, 1925.
J. A. MANOS
1,529,319
COMBINED SCOOP AND MOLD FOR ICE CREAM
Filed Sept. 17, 1924
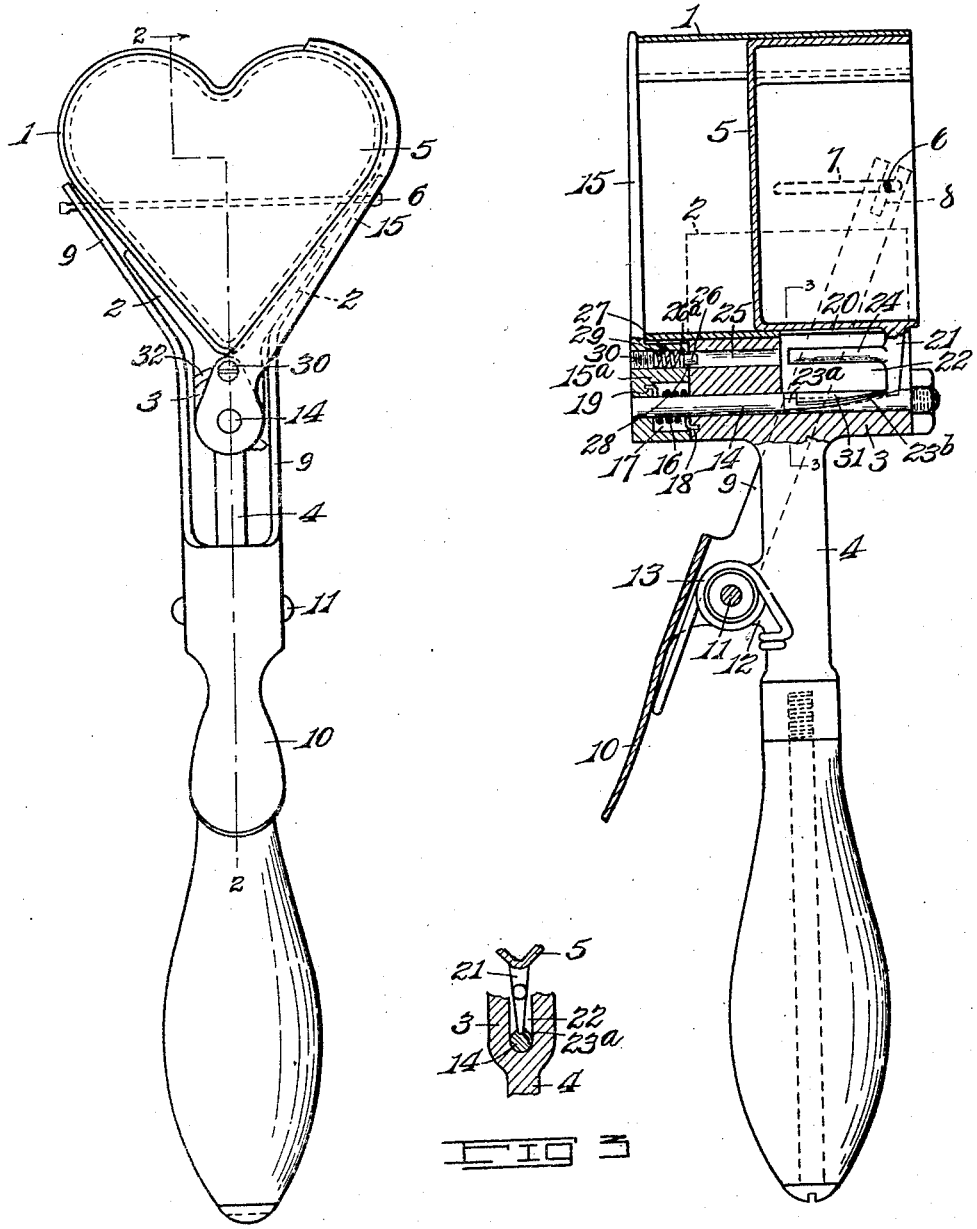
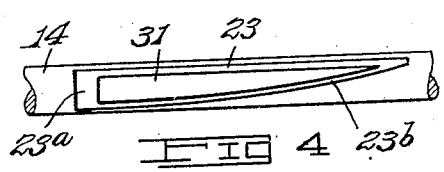
INVENTOR
John A. Manos.
By N. E. Dunlap
ATTORNEY Patented Mar. 10, 1925.

1,529,319

UNITED STATES PATENT OFFICE.

JOHN A. MANOS, OF TORONTO, OHIO.

COMBINED SCOOP AND MOLD FOR ICE CREAM.

Application filed September 17, 1924. Serial No. 738,175.

*To all whom it may concern:*

Be it known that I, JOHN A. MANOS, a citizen of the United States of America, and a resident of Toronto, county of Jefferson, and State of Ohio, have invented certain new and useful Improvements in Combined Scoops and Molds for Ice Cream, of which the following is a specification.

This invention relates broadly to ice cream scoops, and more specifically to a combined scoop and mold for ice cream.

The primary object of the invention is to provide an ice-cream mold which may be employed as a scoop or dipper and embodying simple and effective means for expelling the molded contents and for shearing or detaching said contents from the mold.

With this and other objects in view, the invention resides in the features of construction, arrangement of parts and combinations of elements which will hereinafter be fully described, reference being had to the accompanying drawings, in which—

Figure 1 is a front elevation of the invention;

Figure 2 is a partial longitudinal section of the same taken substantially on line 2—2, Fig. 1;

Figure 3 is a detail section on line 3—3, Fig. 2; and—

Figure 4 is an enlarged top plan view of the guideway-carrying portion of the blade-carrying bolt.

Referring to said drawings, 1 indicates a tubular member or casing, herein shown as of heart shape in cross section, which is rigidly mounted upon opposite divergently inclined arms 2 formed on or carried by the transversely extending head portions 3 of a handle 4. Said casing 1, which, as herein shown, is open at both ends, has slidably mounted therein a close-fitting expulsion member, or plunger, 5 of hollow cup-like form, the same being normally maintained in a retracted position within the rear end portion of the casing and being manually shiftable for expelling from the latter the material collected therein in front of the plunger.

A pin or rod 6 directed horizontally through the side walls of the plunger has its opposite ends projecting outward through opposite longitudinally extending guide-slots 7 provided therefor in the adjacent walls of the casing 1. Said ends of the rod 6 are received in slots 8 provided in the end portions of arms 9 carried by or formed integral with a plate 10, said arms and said plate together constituting an operating lever which is pivotally carried intermediate its ends upon the handle 4. Said lever is mounted upon a pivot pin 11 carried by a lug 12 formed on said handle. A spring 13 interposed between the plate portion of said lever and said handle and coiled about said pivot-pin 11 serves to normally hold said lever in the position shown in Fig. 2, in which position its arms 9 occupy straddling relation to the head portion of the handle holding the plunger in its retracted position.

Rotatably mounted in and extending longitudinally through the lower portion of the head 3 is a pin or bolt 14, and rigidly mounted on the projecting front end of said bolt is a boss $15^a$ formed on or integral with an end of a cutting blade 15. A coil spring 16 encircling the bolt 14 and disposed in a socket 17 provided therefor in the boss $15^a$ has one end directed inwardly and seated in a socket or recess 18 is the outer end of the head 3 and its opposite end directed outwardly and seated in a socket or recess 19 is the adjacent face of said boss. Said spring is held controlled for maintaining the blade in the retracted position shown in Fig. 1, wherein the latter lies in unobstructing relation to the outer open front end of the casing 1.

A longitudinal slot 20 is provided in the rear end portion of the lowermost part of the casing, and movable in said slot as the plunger is actuated within the casing is a lug or arm 21 carried by or formed on the adjacent plunger wall, said lug or arm extending downward through a channel 22 provided in the head 3 and having its lower end or point received in the rear end of a longitudinally extending guide-groove 23 provided in the adjacent face of the bolt 14.

The depending arm 21 carries on the front face thereof an integral or fixed pin 24 which extends forwardly parallel to the bolt 14, said pin being adapted, when the plunger is advanced for expelling the contents of the casing, to enter and travel in a bore 25 provided therefor in that portion of the head 3 which is located forward of the channel 22, and, as it approaches the limit of its forward thrust, to dislodge from said bore a small locking pin 26 which is normally disposed in said bore, as shown in Fig. 2. Said pin 26 has a head 26ª on its outer end received in a horizontal bore 27 provided in the boss 15ª of the blade 15 and has its end protruding through a reduced opening 28 which is axially alined with said bore 27. A spiral spring 29 disposed in said bore 27 between said head 26ª and a plug 30 employed as a closure for the outer end of said bore exerts a pressure which tends to hold said pin 26 in the advanced position shown in Fig. 2.

When the pin 26 is dislodged from the bore 25 by the final portion of the advance movement of the pin 24, as aforesaid, the blade 15, fixed on the bolt 14, as aforesaid, is rendered free to rotate and is instantly actuated by the expanding force exerted by the spring 16, previously held contracted, to rotate across the open front end of the casing for detaching the semisolid contents of the casing from the face of the plunger 5, the latter at the instant of blade actuation being flush with said open end of the casing.

Since the blade is carried in fixed relation to the bolt 14, the latter obviously rotates with the blade. Such rotary movement of the bolt is permitted by the provision therein of a short groove 23ª at a right angle to and communicating with the front end of the groove 23.

Manifestly, the advance movement of the plunger for expelling the contents of the casing is actuated by hand or thumb pressure applied to the plate portion 10 of the operating lever, such pressure acting to rotate or swing said lever on its pivot-pin 11 against the tension of the spring 13. In such swinging movement of the lever, the rod 6 carried by the plunger and engaged by the arms 9 of said lever is advanced, traveling in the slots 7 of the casing.

The spring 13 employed necessarily possesses the strength required not only to retract the plunger, but also to force the return of the blade to its normal retracted position against the tension of its actuating spring 16. Said return of the blade is effected during the retracting movement of the plunger through the travel of the end of the plunger-carried arm 21 in an inclined or spirally disposed return groove 23ᵇ provided in the bolt 14, said groove connecting the cross-groove 23ª to the rear end of the longitudinal groove 23, as is shown in Figs. 2 and 4.

Obviously, the grooves 23, 23ª and 23ᵇ might be united throughout their lengths to form a plain triangular recess by the mere omission of the thereby enclosed area 31.

As the blade is actuated for detaching the molded contents of the casing from the plunger, as described, and as said blade is returned to its normal retracted position, the small blade-locking pin 26 is carried therewith, its point sliding freely over the adjacent face of the head 3 of the handle, or, if desired, traveling in a shallow curved groove 32 provided therefor in said face, shown in Fig. 1.

What is claimed is—

1. An ice cream scoop comprising a casing, a plunger shiftable within said casing for expelling the contents of the latter, a spring normally holding said plunger retracted, a lever depressible for advancing said plunger, a shearing blade adapted for rotary movement across the front end of the casing, a spring for actuating said blade in one direction, means normally locking said blade against movements, and means for dislodging said locking means at the limit of advance movement of the plunger.

2. An ice cream scoop comprising a casing, means shiftable within the casing for expelling the contents of the latter, a lever whereby said expelling means is advanced, a shearing blade operable across the front end of the casing for detaching said contents from the advanced expelling means, automatic means for actuating said blade, means normally locking said blade against movement, means for dislodging said locking means at the limit of advance movement of the plunger, and automatic means for returning said expelling means and said blade to retracted positions.

3. An ice cream scoop comprising a casing, means shiftable within the casing for expelling the contents of the latter, a lever whereby said expelling means is advanced, a shearing blade operable across the front end of the casing, a spring for actuating said blade, means normally holding said blade in retracted position, means actuated by advance movement of said expelling means for releasing said holding means, and a spring for simultaneously effecting retraction of said expelling means and said blade.

4. An ice cream scoop comprising a casing, a plunger shiftable within said casing for expelling the contents of the latter, a lever whereby said plunger is advanced, a spring whereby said lever is actuated to retract said plunger following advance movement thereof, a shearing blade operable across the front end of said casing, a spring for actuating said blade, means normally locking said blade in retracted position against the tension of said spring, and means carried by the plunger whereby release of said locking means is effected at the limit of advance movement of the plunger, said lever-retracting spring being adapted to effect simultaneous retraction of said blade.

In testimony whereof, I affix my signature in presence of two subscribing witnesses.

JOHN A. MANOS.

Witnesses:
MARTIN T. MANION,
H. E. DUNLAP.